United States Patent [19]
Eastmond

[11] 3,873,925

[45] Mar. 25, 1975

[54] AUDIO FREQUENCY SQUELCH SYSTEM

[75] Inventor: Bruce C. Eastmond, Darien, Ill.

[73] Assignee: Motorola, Inc., Chicago, Ill.

[22] Filed: Mar. 7, 1974

[21] Appl. No.: 449,119

[52] U.S. Cl. .................. 325/478, 325/348, 325/402, 325/456

[51] Int. Cl. .................. H04b 1/10

[58] Field of Search .......... 325/313, 323, 371, 377, 325/348, 402, 456, 473, 478, 50, 330; 179/1 P, 1 VL, 1 SW; 330/51; 178/DIG. 12

[56] References Cited

UNITED STATES PATENTS

| | | | |
|---|---|---|---|
| 3,102,236 | 8/1963 | Eichenberger et al. | 325/478 |
| 3,213,372 | 10/1965 | Kurvits | 325/478 |
| 3,325,738 | 6/1967 | Busby et al. | 325/478 |
| 3,350,650 | 10/1967 | Kemper | 325/478 |
| 3,603,884 | 9/1971 | Zaura, Jr. | 325/348 |
| 3,660,765 | 5/1972 | Glasser et al. | 325/478 |

*Primary Examiner*—Robert L. Griffin
*Assistant Examiner*—Jin F. Ng
*Attorney, Agent, or Firm*—Eugene A. Parsons; Vincent J. Rauner

[57] ABSTRACT

An audio frequency squelch circuit responsive to a signal including voice signals in the presence of noise includes a limiter for receiving the signal and a monostable multivibrator coupled to the limiter and triggered by negative (or positive) transitions in the limiter output. The multivibrator produces pulses of fixed amplitude and time duration to provide an output wave having a duty cycle which varies with frequency. The pulse wave is passed through a low pass filter having a bandwidth sufficiently wide to allow coherent variations in frequency at a voice syllabic rate, and which removes random noise inputs, with opposite phases being applied to high pass filters which reject signals varying slowly in frequency. The opposite phase signals are applied separately to comparators operating against a fixed voltage reference, one of which provides an output in response to voice frequency peaks which are sufficiently above the mean frequency and the other provides an output in response to voice frequency peaks which are sufficiently below the mean frequency. The comparator outputs are applied to an OR gate which controls an integrator and timer to actuate the squelch.

In an alternate embodiment, the multivibrator output is applied to the short time constant, low pass filter, as in the prior embodiment, and also to a long time constant, low pass filter, the output of which is proportional to the mean audio frequency and provides a floating voltage reference. the floating reference is shifted in positive and negative directions, and the two resulting, level shifted, floating references are each applied to a comparator, to which the output of the short time constant filter is also applied. The two comparators provide outputs in response to the voice frequency peaks which are sufficiently above and below the mean frequency, and signals varying slowly in frequency are removed by common mode rejection in the comparators. The two comparator outputs are applied to an OR gate which controls an integrator and timer to actuate the squelch, as in the prior embodiment.

12 Claims, 5 Drawing Figures

AUDIO FREQUENCY SQUELCH SYSTEM

BACKGROUND OF THE INVENTION

It is necessary for satisfactory operation of communication receivers to provide a squelch circuit which automatically mutes the receiver when no signal is received, to thereby prevent the reproduction of noise which is picked up and/or developed by the receiver when no signal is present. In frequency modulation receivers, carrier information is utilized to provide the squelch operation. However, for single sideband receivers no such carrier information is available from which the squelch signal can be derived, and the squelch signal must be derived from the characteristics of the voice signal. It is important that the squelch action is not sensitive to diurnal variations in ambient atmospheric noise levels and high impulse noise levels which are prevalent in the range from 2 to 30 megahertz, where single sideband systems commonly operate.

Various types of squelch systems responsive to received signals have been provided, including squelch circuits which derive the signal from the automatic gain control circuit of the receiver. However, these circuits are subject to falsing by changes in atmospheric noise and high impulse noise. Squelch circuits have also been provided which gate through the audio for a present period of time after the onset of a fast rise in the audio envelope above its average level. Although these circuits reject variations in ambient atmospheric noise, they are subject to impulse noise falsing. Other known squelch systems which have detected various characteristics of the audio signal have the disadvantage that they require careful adjustment to reject the impulse noise.

SUMMARY OF THE INVENTION

It is an object of the present invention to provide an improved squelch circuit for use with single sideband communications receivers.

A further object of the invention is to provide a squelch circuit for a single sideband receiver wherein the squelch control voltage is derived solely from the audio frequency output of the receiver.

Another object of the invention is to provide a squelch circuit operating from the audio signal which is not sensitive to changing ambient atmospheric noise levels and to high impulse noise levels.

A still further object of the invention is to provide a squelch circuit for use in a single sideband receiver which does not require precise balancing and adjustment for satisfactory practical operation.

Still another object of the invention is to provide a squelch circuit for providing a control voltage from an audio frequency output, which passes variations in frequency at a syllabic rate, and which responds to frequencies in the speech signal which deviate by a predetermined amount from the mean.

The squelch circuit of the invention derives a squelch control voltage by passing variations in frequency at a voice syllabic rate, and responds to deviations of frequency which extend a predetermined amount above and below the mean frequency. To provide this action, the speech signal is limited and a differentiating circuit provides pulses at the transitions of the limited wave to trigger a monostable multivibrator. Either negative or positive transitions can be used. The monostable multivibrator produces pulses of fixed amplitude and time duration, with the time duration being such that the duty cycle of the output wave is of the order of 90 percent in response to a signal of the highest frequency of interest. The pulse wave is passed through a low pass filter to provide an output voltage which is a linear function of the audio frequency, over the range of frequencies of interest. The bandwidth of the filter is sufficiently wide to pass coherent variations in frequency at a voice syllabic rate, and to filter random noise inputs. Opposite phases of the filter output are applied through high pass filters, which remove slow variations in frequency, to comparators which produce an output when the peaks of the applied waves exceed a fixed reference voltage. The outputs of the comparators represent frequencies higher and lower than the mean frequency, by a predetermined amount, and these outputs are combined in an OR gate to provide a composite wave. The composite wave is applied to an integrator which controls a timer for providing pulses for controlling the squelch action. These pulses are shaped to provide the desired operation of the squelch switch.

In an alternate embodiment, the multivibrator output is applied to the short time constant, low pass filter, and also to a long time constant, low pass filter which provides a floating reference. The floating reference is applied to first and second direct current level shift circuits which shift the floating reference in positive and negative directions to provide upper and lower limits. The output of the short time constant filter which passes variations at a voice syllabic rate is applied to two comparators, to which the two shifted floating references are applied. Low frequency variations are removed from the outputs of the comparators by common mode rejection, and the output of one comparator represents variations in frequency which are a predetermined amount above the mean frequency, and the output of the second comparator represents variations in frequency which are a predetermined amount below the mean frequency, as in the other embodiment. These outputs are utilized in the same way as in the first embodiment.

DETAILED DESCRIPTION

Figure 1:
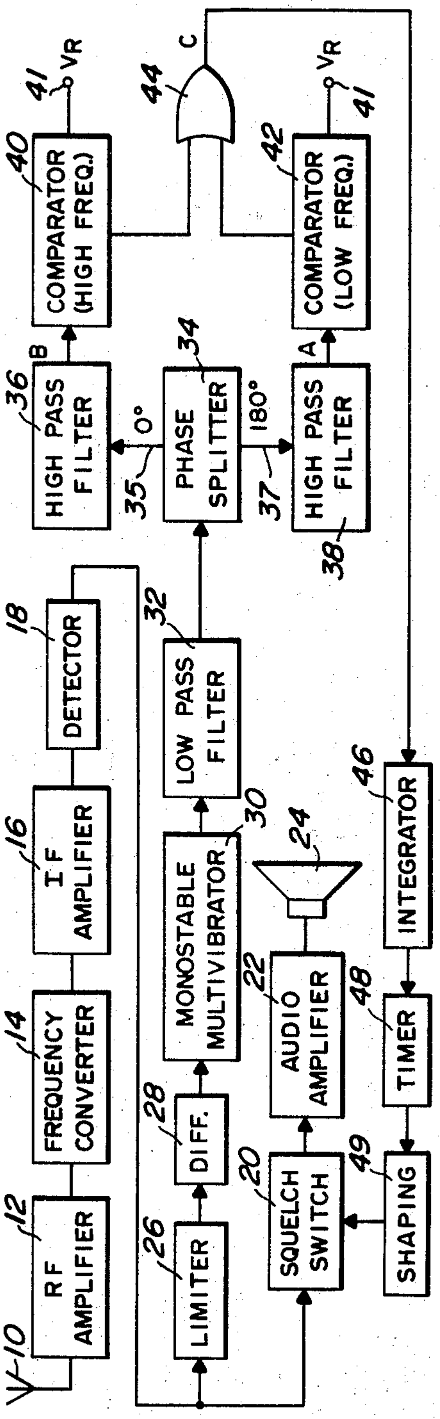
FIG. 1 is a block diagram of one embodiment of the audio frequency squelch system of the invention.

The block diagram in FIG. 1 represents a single sideband receiver incorporating the audio frequency squelch system. The receiver includes an antenna 10 for picking up signals, radio frequency amplifier 12 for amplifying received signals, frequency converter 14 for changing the frequency of the received signals to an intermediate frequency, intermediate frequency amplifier 16 for amplifying the intermediate frequency signals, and detector 18 for deriving the audio signals from the carrier wave. The equipment represented by the four blocks 12, 14, 16 and 18 may be of any known construction.

The audio signals derived by the receiver are applied through squelch switch 20 to audio amplifier 22, which may include a plurality of stages for increasing the level of the audio signal as may be required. The audio output of the amplifier 22 is applied to reproducing means represented by the loudspeaker 24. It is obvious that any other known reproducing means can be used.

The squelch system of the invention is used for controlling the operation of squelch switch 20 to selectively reproduce the desired audio frequency signals derived from the detector 18 of the receiver. This includes a limiter 26 which is a high gain saturating amplifier. The output of the limiter 26 is applied to a differentiating circuit 28 which, in turn, triggers monostable multivibrator 30 at each negative transition of the limiter output. The monostable multivibrator produces a fixed voltage amplitude pulse having a constant time duration each time the multivibrator is triggered. The time duration of the monostable multivibrator output voltage pulse is chosen so that the duty cycle of the voltage pulse train is approximately 90 percent at the highest frequency of interest in the single sideband receiver audio passband. This may be the highest frequency utilized for voice transmission, such as 3,000 cycles.

The monostable multivibrator 30 together with the low pass filter 32 form a pulse count discriminator. The average voltage output from the monostable multivibrator is a measure of the frequency of occurrence of the zero crossings of the audio signal, and the output voltage of the low pass filter is a linear function of frequency, over all the frequencies of interest in the audio signal of the receiver. The low pass filter has a cutoff frequency of approximately 15 hertz, and the bandwith is wide enough to allow coherent variations in frequency which occur at a voice syllabic rate to be passed, yet narrow enough to provide considerable filtering of random noise inputs.

The output wave of the low pass filter drives a phase splitter 34 having a first output 35 applied to high pass filter 36, and a second output 37 applied to high pass filter 38. The two outputs 35 and 37 are 180° out-of-phase so that the peaks of one wave represent high frequencies in the audio signal, and the peaks of the other wave represent low frequencies. The high pass filters may be identical, having cutoff frequencies of the order of 0.7 hertz, which is sufficiently low to allow coherent variations in frequency which occur at a voice syllabic rate to be passed, and yet sufficiently high to reject frequency offsets due to mistuning, variations in the intermediate frequency passband characteristics, and signals varying slowly in frequency which convey no useful information.

The output wave of high pass filter 36 is applied to comparator 40 and the output wave of high pass filter 38 is applied to comparator 42. The voltage reference 41 is applied to comparator 40, and the same voltage reference 41 may be applied to comparator 42. The comparators 40 and 42 each produce an output when the waves applied thereto exceeds the voltage reference, with the voltage peaks which produce outputs representing voice syllables having frequencies above or below the mean frequency. The outputs of the comparators 40 and 42 are applied to OR gate 44 which combines the outputs from the two comparators 40 and 42. Accordingly, both positive and negative frequency excursions from the mean frequency, which are greater than some value represented by the reference voltage, are detected and utilized in the output.

The voltage pulse output from the OR gate 44 is applied to integrator 46 which rejects pulses having a duration less than a predetermined time, such as 10 milliseconds. Longer pulses are passed to the timer 48 which is activated to provide a squelch control pulse. This is applied through shaping circuit 49 to the squelch switch 20 previously referred to. If the pulse from integrator 46 has a duration within a range from approximately 10 to 30 milliseconds, the duration of the output pulse from the timer is proportional to the duration of the pulse applied thereto. If the pulse from integrator 46 is longer than approximately 30 milliseconds, the timer is activated for a period of approximately 3.25 seconds after the termination of the pulse, so that the squelch will hold through voice pauses and short fades. The shaping network 49 applies a pulse to the squelch switch 20 shaped to cause the squelch to close softely to provide a condition which has been found to be desirable based on subjective listening tests.

Figure 2:
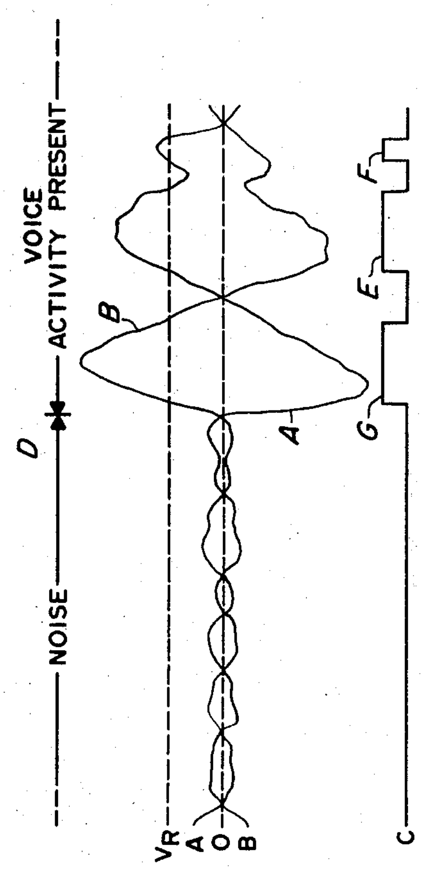
FIG. 2 is a chart showing waveforms developed in the system of FIG. 1.

Referring now to FIG. 2, the left side of waveform A shows the response of the low pass filter 32 in the system of FIG. 1, for a period in which there is no voice signal and only noise is applied to the limiter of the squelch system. Curve B shows the reverse phase produced by the phase splitter 34. At the time designated D in FIG. 2, a voice signal begins and it will be noted that the amplitude of the filter output swings to both higher and lower peak values. The output A swings first to a much lower value than the average and then to higher values and this wave passes through the high pass filter 38 to the low frequency comparator 42 wherein the higher values produce outputs represented by pulses E and F of waveform C. The output B first swings high, and this peak applied through filter 36 to comparator 40 will exceed the voltage reference $V_R$ to provide a pulse G at the output of comparator 40, as shown in the waveform C. The pulses, E, F and G are ORed by the gate 44 to form the composite pulse wave shown by C.

Figure 3:
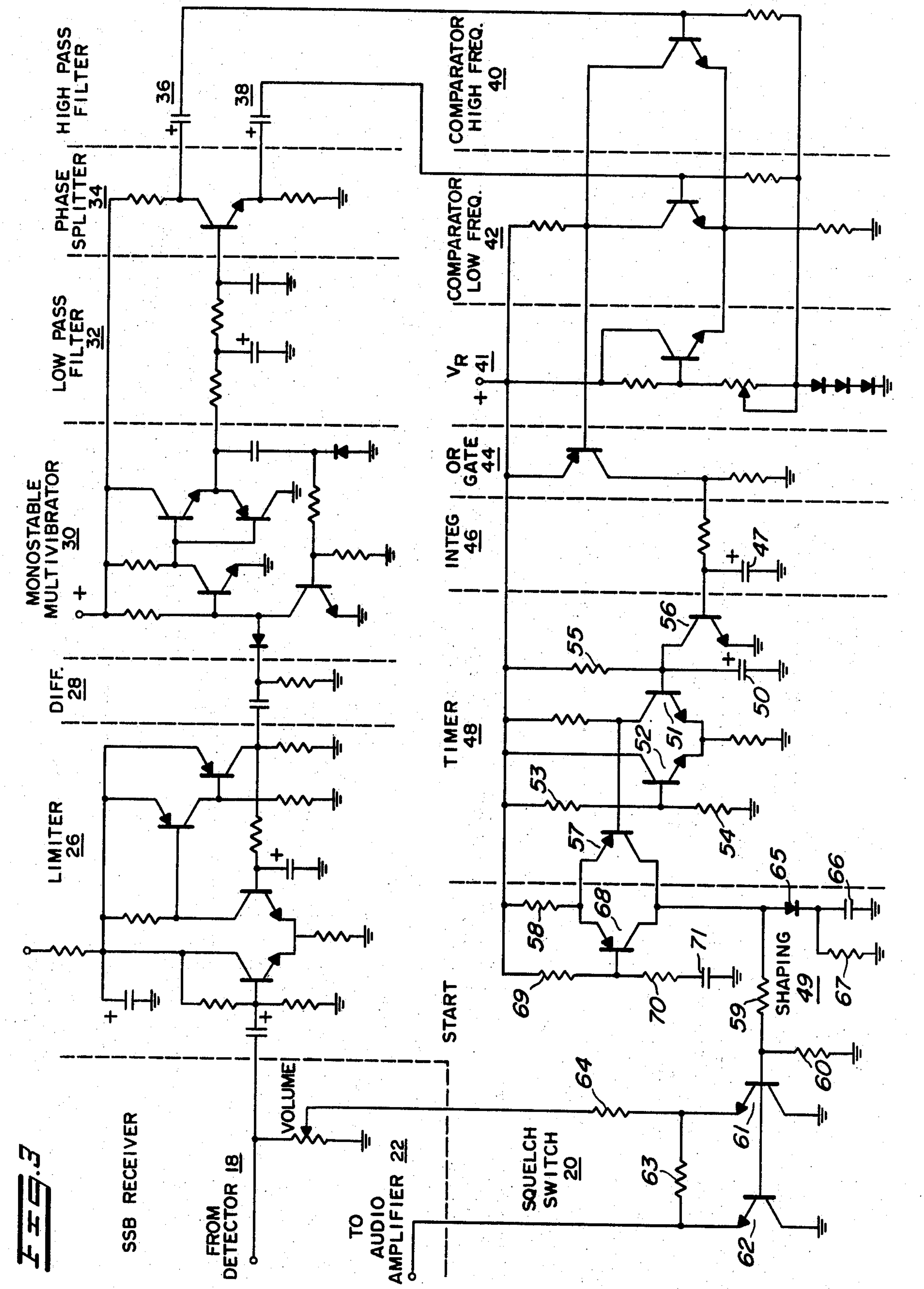
FIG. 3 is a circuit diagram of the system shown in FIG. 1.

FIG. 3 is a circuit diagram of a specific circuit configuration which has been used to provide the audio frequency squelch system of FIG. 1. This circuit is especially adapted for construction as an integrated circuit. The specific circuit connections are apparent from the drawing and will not be described. The parts are numbered to correspond with the numbering in FIG. 1. It will be noted that the low pass filter 32 includes two sections, and that each of the high pass filters 36 and 38 is formed by a capacitor and a load resistor.

The timer 48 includes a timing capacitor 50 connected to the base of transistor 51, which cooperates with transistor 52 to form a differential amplifier. A reference voltage is applied to the base of transistor 52 by the voltage divider including resistors 53 and 54. Capacitor 50 is normally charged from the 9.6 volt regulated supply through resistor 55, and is discharged by the conduction of transistor 56. When closely spaced pulses are passed by the OR gate 44 for a predetermined time duration, integrator 46 applies a voltage to transistor 56 to turn on this transistor so that capacitor 50 will be shorted thereby, and the capacitor will discharge. When transistor 56 conducts, the collector thereof is brought to ground and this grounds the base of transistor 51. This will turn off transistor 51 so that the collector potential rises to the + supply potential. This potential is applied to the base of transistor 57 and causes this transistor to turn off so that its collector potential goes down.

Normally, transistor 57 is conducting so that the supply potential is applied through resistor 58, the emitter-collector path of transistor 57, and resistors 59 and 60. The potential from the junction of resistors 59 and 60 is applied to the base electrodes of transistors 61 and 62. These transistors ground the audio signal forming the transistor switch 20 of FIG. 1. When transistor 57 is rendered non-conducting by the potential from the integrator, the turn off potential is removed from the bases of transistors 61 and 62 so that these transistors are rendered non-conductive. The audio signal is not grounded and is then conducted through resistors 63 and 64 from the receiver detector 18 to the audio amplifier 22.

The audio signal must be present for a predetermined time, such as 10 milliseconds, for the integrator 46 to provide a sufficient voltage across capacitor 47 thereof to render transistor 56 conducting. When transistor 56 is rendered conducting, it will immediately turn off transistor 51 to provide the squelch action, as has been described.

The conduction of transistor 56 also discharges the timing capacitor 50. If the transistor 56 is turned orf for a period of 20 milliseconds as a result of an audio signal which continues for 30 or more milliseconds, this will completely discharge the capacitor 50. The voltage across capacitor 50 will act to hold transistor 51 non-conducting until capacitor 50 charges through resistor 55 to a value equal to the potential applied to the base of transistor 52 by the voltage divider including resistors 53 and 54. This will hold the squelch off for a given time after the voice signal terminates. The value of resistor 55 can be selected to control this time, and this may be selected to hold the squelch open for three seconds or so, to hold the audio open through voice pauses and short fades in the signal.

After capacitor 50 charges to turn on transistor 51, and transistor 57 is thereby turned on to cause the squelching action, the potential across resistors 59 and 60 cannot rise rapidly because of diode 65 and capacitor 66 connected thereacross. This will cause the transistors 61 and 62 to turn on slowly, so that the audio is not cut off abruptly. Capacitor 65 discharges through resistor 67 so that the potential across resistors 59 and 60 rises to turn on transistors 61 and 62 of the audio switch. Diode 65, capacitor 66 and resistor 67 form the pulse shaping circuit 49 of FIG. 1.

Connected in parallel with transistor 57 is a transistor 68, the base of which is connected to a voltage divider including resistors 69 and 70 and capacitor 71. When the radio is first turned on, capacitor 71 will be discharged, and the voltage divider will apply a potential to the base of transistor 68 to render this transistor conducting. This will complete the circuit through resistors 58, 59 and 60 to apply a potential to the base electrodes of transistors 61 and 62 to render the same conducting, to shunt the audio so that the receiver is squelched. This insures that signals are not reproduced when the radio is first turned on and the limiter and other components might provide voltages to actuate the squelch system. Capacitor 71 charges up after a short time to provide a potential at the base of transistor 68 to turn this transistor off, and it will not conduct during normal operation of the receiver.

Transistor 57 will be turned on when the receiver is operated normally, until a voice signal is received which provides a potential to the timer 48 to turn transistor 57 off so that the potential applied to the transistors 61 and 62 of the audio switch 20 is removed, and the audio signal is allowed to pass through resistors 63 and 64 from the detector 18 to the audio amplifier 22.

Figure 4:
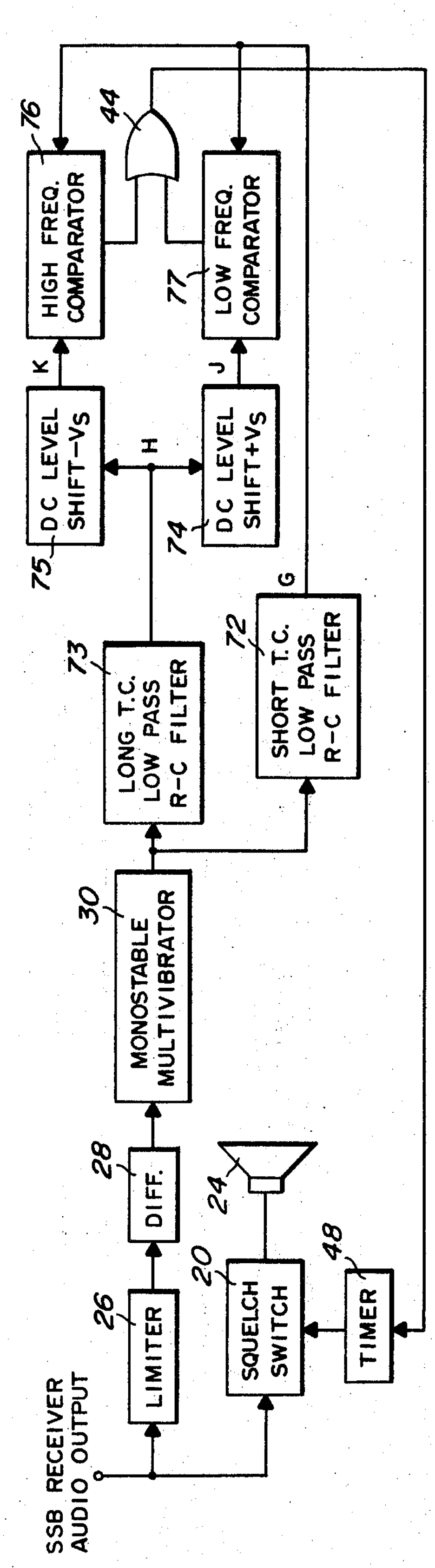
FIG. 4 is a block diagram of a second embodiment of the invention.

FIG. 4 shows a second embodiment of the audio frequency squelch system of the invention. Some of the components are the same as in the system of FIG. 1 and are indicated by the same reference numerals. The limiter 26, differentiating circuit 28 and monostable multivibrator 30 may be the same as these corresponding elements in the system of FIG. 1. Also, the short time constant low pass filter 72 may have generally the same characteristics as the low pass filter 32 in the system of FIG. 1.

In the system of FIG. 4, the output of monostable multivibrator is applied to a second filter, which is the long time constant, low pass filter 73. The output of this filter, which is proportional to the mean audio frequency, is shown by curve H in FIG. 5. The output of the long time constant filter 73 varies slowly and forms a floating reference which is applied to DC level shift circuits 74 and 75, which add positive and negative voltage shifts to the floating reference. The resulting shifted floating references are shown by the dotted lines J and K in FIG. 5, with the positive shift providing the floating reference J, and the negative shift providing the floating reference K. The shifted floating references are applied to comparator circuits 76 and 77 to which the output of the short time constant low pass filter 72 is also applied. The output of filter 72 is shown by curve L in FIG. 5.

Figure 5:
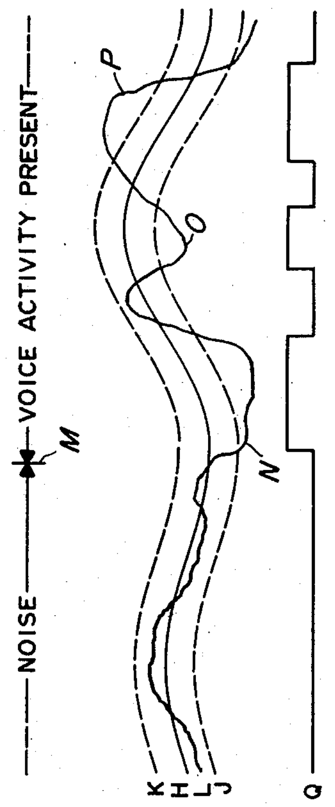
FIG. 5 is a chart with waveforms showing the operation of the system of FIG. 4.

As is apparent from FIG. 5, the output L of the short time constant filter will not vary substantially from the mean audio frequency H when noise is present. This variation is within the limits of the shifted references J and K. However, at point M when a voice signal appears, the short time constant low pass filter 72 will pass variations in frequency at a voice syllabic rate. This will cause the output of the filter to vary substantially from the mean frequency as shown in FIG. 5. Since the output of the filter 72 varies with the frequency of the audio signal, the portions below the mean will represent low frequency audio signals and the portions above the mean will represent high frequency audio signals. In FIG. 5 the short time constant filter output is shown having a peak at point N below the negative shifted reference J to produce an output from the low frequency comparator 77 shown in line Q. This will continue as long as the filter output is below the refêrence J. A second pulse is produced in line Q when the filter output L again falls below the negative shifted reference J. At point P the output of the short time constant filter has a peak which exceeds the positive shifted reference K to provide an output from comparator 76. The outputs of the two comparators 76 and 77 are applied to OR gate 44 and combined to produce the pulse wave Q (FIG. 5). This wave is applied to the timer 48 which controls squelch switch 20, which may be the same as in FIG. 1. The other elements, such as the integrator 46 and pulse shaper 49 in FIG. 1, may also be provided in the system of FIG. 4.

The operation of the system of FIG. 4 is generally similar to that of FIG. 1. In FIG. 1, the slow variations in frequency are removed from the output of the filter 32 by the high pass filters 36 and 38. In this system the filter output is compared to a fixed reference voltage in the comparators, and the filter output in response to peaks representing high frequencies which exceed a predetermined level produce an output in one comparator, and peaks representing low frequencies which drop below a predetermined level produce an output in the other comparator. These outputs are combined to provide a pulse wave which indicates that a voice signal is present, and which is utilized to control the operation of the squelch circuit to pass the audio signal. In the system of FIG. 4, variations of the filter output 72 representing variations in the mean frequency are not rejected by a high pass filter, but are compared against the mean variation provided by the long time constant filter 73 which is applied as a reference to the comparators. The slow variations in frequencies are removed from the outputs of the comparators by common mode rejection in the comparators.

The system of FIG. 1 is somewhat simpler than that of FIG. 4 in that fixed reference voltages can be applied to the comparators rather than a voltage which floats with the mean audio frequency, and which is shifted by positive and negative direct current voltages to define the limits of the peaks passed by the comparators. In both cases, the comparators pass peaks of the filter output which represent high frequencies and low frequencies in the voice signal, and reject slow variations in the signal.

The squelch system which has been described has been found to provide highly satisfactory operation in single sideband communications receivers. This squelch system is not sensitive to variations in ambient atmospheric noise levels nor to high impulse noise bursts. The system as described is suitable for construction in integrated circuit form so that it can be provided at low cost and it requires a very small space. The system is not critical of adjustment and is suitable for use in mobile receivers, such as for marine application.

I claim:

1. A squelch circuit for controlling the transmission of voice signals in a given frequency range and which have a predetermined signal-to-noise characteristic, including in combination:

limiter means for receiving an audio signal and limiting the amplitude thereof, a monostable multivibrator for providing a pulse of fixed amplitude and time duration, said multivibrator being coupled to said limiter means and triggered thereby each time the output thereof makes a transition from a given polarity to the opposite polarity, filter means having a bandwidth to pass signals varying at a voice syllabic rate coupled to said multivibrator for filtering the pulse wave from said multivibrator, first signal means coupled to said filter means including first comparator means for providing a first output signal representing a voice frequency peak having a frequency higher than the mean voice frequency, second signal means coupled to said filter means including second comparator means for providing a second output signal representing a voice frequency peak having a frequency lower than the mean voice frequency, output means connected to said first and second signal means for providing a control signal in response to one of said output signals from said comparator means, and squelch switch means connected to said output means for receiving the control signal therefrom and controlling the transmission of voice signals.

2. The squelch circuit of claim 1 wherein said monostable multivibrator produces a pulse having a time duration such that the duty cycle of the output of said multivibrator is of the order of 90 percent in response to signal at the highest frequency in the given frequency range.

3. The squelch circuit of claim 1 wherein said output means includes an OR gate for combining the outputs of said first and second signal means and control means coupling said OR gate to said squelch switch means.

4. The squelch circuit of claim 3 wherein said control means includes integrator means responsive to said combined signal, and timer means coupled to said integrator means and controlled by the output pulse therefrom for controlling said squelch switch means.

5. The squelch circuit of claim 4 wherein said timer means produces an output pulse having a time duration which depends upon the duration of the pulse supplied thereto by said integrator means.

6. The squelch circuit of claim 4 wherein said timer means produces an output pulse in response to a pulse applied thereto from said integrator means, the time duration of said output pulse being longer than the duration of said applied pulse when the duration of said applied pulse exceeds a predetermined time.

7. The squelch circuit of claim 4 wherein said control means includes pulse shaping means coupling said timer means to said squelch switch.

8. A squelch circuit in accordance with claim 1 further including, phase splitter means connected to said output of said filter means and having first and second outputs providing opposite phase signals, and wherein said first signal means includes a first high pass filter coupling said first output of said phase splitter to said first comparator means, and voltage reference means connected to said first comparator means whereby said first comparator means provides said first output signal, and wherein said second signal means includes a second high pass filter coupling said second output of said phase splitter to said second comparator means, and means connecting said voltage reference means to said second comparator means whereby said second comparator means provides said second output signal.

9. A squelch circuit in accordance with claim 8 wherein said first and second high pass filters reject slow variations in frequency resulting from a variation in the main frequency of the voice signals.

10. A squelch circuit in accordance with claim 8 wherein said voltage reference means has a value that said first and second comparator means produces outputs only when said signals passed by said filter means have peaks which differ from the mean value thereof by a voltage exceeding a predetermined value.

11. A squelch circuit in accordance with claim 1 further including a long time constant low pass filter coupled to said monostable vibrator for providing a reference floating at a low frequency, and wherein said first signal means includes a first direct current level shift circuit connected to said long time constant filter for shifting said floating reference in one direction, and said first comparator means is coupled to said first level shift circuit and to said filter means and is responsive to the signals therefrom for providing said first output signal, and wherein said second means includes a second direct current level shift circuit connected to said long time constant filter for shifting said floating reference in the opposite direction, and said second comparator means is coupled to said second level shift circuit and to said filter means and is responsive to the signals therefrom for providing said second output signal.

12. The circuit of claim 11 wherein said long time constant filter has a time constant greater than the period of the signal of the lowest frequency in the frequency range, and said filter means has a time constant less than the period of the signal of the highest frequency in the frequency range.

* * * * *